April 23, 1963  E. C. GARRETT  3,086,794

FENDER BOOTS FOR AUTOMOBILES

Filed May 8, 1961

INVENTOR.
EDWARD C. GARRETT
BY
W. B. Harpman
ATTORNEY

United States Patent Office 3,086,794
Patented Apr. 23, 1963

3,086,794
FENDER BOOTS FOR AUTOMOBILES
Edward C. Garrett, 1476 W. Calla Road, R.D.,
Poland, Ohio
Filed May 8, 1961, Ser. No. 108,662
5 Claims. (Cl. 280—152)

This invention relates to a fender boot and more particularly to a boot formed of resilient plastic material and adapted to be positioned in an automobile fender to form a boot or a casing for a vehicle wheel.

The principal object of the invention is the provision of fender boots that may be positioned in the fenders of an automobile to form wheel housings for the vehicle wheels to protect the fenders.

A still further object of the invention is the provision of a fender boot for a wheel housing in an automobile and wherein the fender boot is formed of resilient plastic material that may be distorted to match the shape of the wheel housing and cut way to match the exterior opening in the automobile wheel housing.

The fender boot disclosed herein comprises an accessory preferably formed of a plastic material such as polyethylene and adapted to be positioned in the wheel housing of an automobile body to form a partial secondary housing for the automobile wheel and thereby protect the metal parts of the automobile body from the water, dirt and salt, ashes and slag that combine to rust out the automobile body parts.

The fender boot disclosed herein is formed for application to the front fenders and the rear fenders or wheel housings of an automobile, the front fender boots providing the necessary clearance for the front wheels when turned and the rear fender boots provide only the necessary clearance for the rear wheels. Both front and rear fender boots are formed with their outside panels adapted to be cut away to match the exterior wheel openings in the fenders or body panels of the automobile so that fender boots will not be seen extending into said wheel opening.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein.

Figure 1:
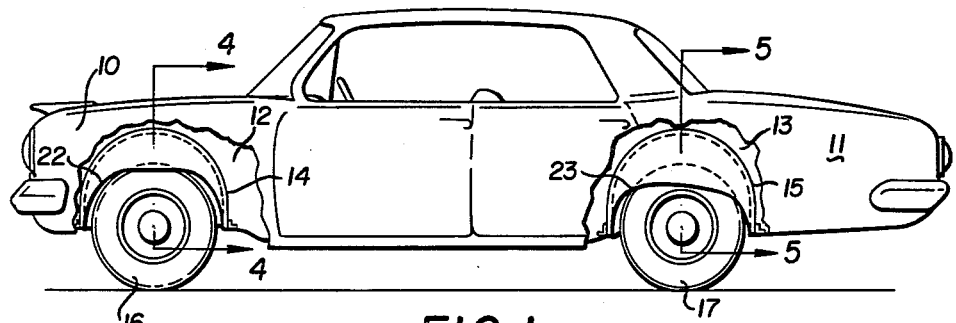
FIGURE 1 is a side elevation of an automobile with parts broken away and showing the fender boots installed therein.

By referring to the drawings and FIGURE 1 in particular, it will be seen that an automobile has been disclosed which includes front body panel or fender section 10 and rear body panel or fender section 11. The area within the front fender section comprises the usual wheel housing 12 and the area within the rear fender section 11 comprises the usual wheel housing 13. A front fender boot 14 is shown positioned in the front wheel housing 12 and a rear fender boot 15 is shown positioned in the rear wheel housing 13. A front wheel 16 is positioned partially within the fender boot 14 and a rear wheel 17 is positioned partially in the rear fender boot 15. The exterior fender opening in both the front and rear fender sections 10 and 11 are illustrated in broken lines and it will be observed that portions of hte fender boots 14 and 15 have been cut away to match the exterior openings in the fender sections 10 and 11.

Figure 2:
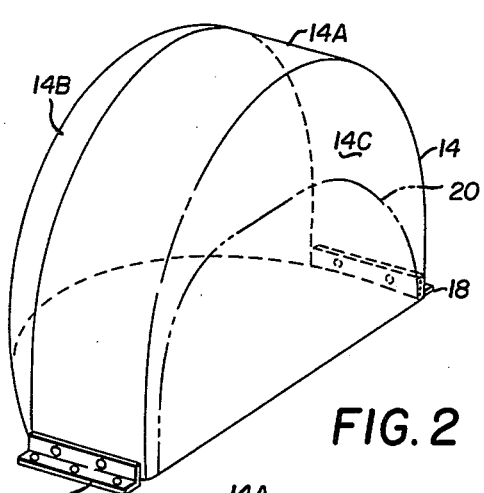
FIGURE 2 is a perspective view of a front fender boot with broken lines showing the area thereof to be cutaway to match the fender opening.

By referring now to FIGURE 2 of the drawings, the front fender boot 14 may be seen to comprise an arcuate portion 14A, an outwardly curving rear portion 14B and a vertical flat front portion 14C, the lower edges of the portions 14A, 14B and 14C defining an open bottom. The lower ends of the arcuate portion 14A are provided with brackets 18, 18 which are attached thereto and which provide means for attaching the fender boot 14 to the body or fender structure of the automobile so as to hold the fender boot 14 in position over, above and around the wheel 16 and thereby form a boot or secondary wheel housing in which the wheel 16 is partially positioned.

Figure 3:
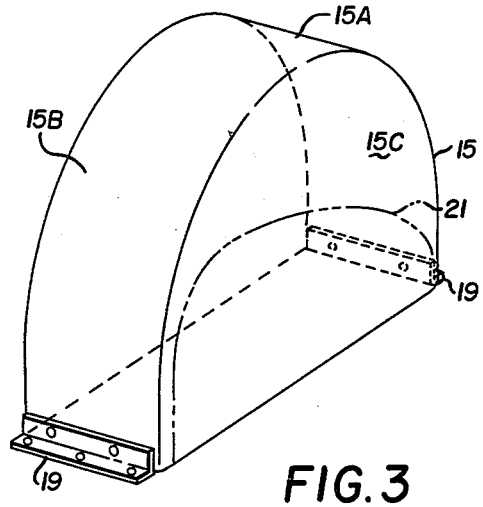
FIGURE 3 is a perspective view of a rear fender boot with broken lines showing the area thereof to be cut away to match the fender opening.

In FIGURE 3 of the drawings the rear fender boot 16 will be seen to comprise an arcuate portion 15A, a vertically positioned flat back portion 15B and a vertically positioned flat front portion 15C, the bottom edges of the portions 15A, 15B and 15C defining a rectangular opening. The bottom ends of the arcuate section 15A have brackets 19, 19 affixed thereto and provide means for attaching the fender boot 15 to the automobile body or fender. A broken line 20 in FIGURE 2 indicates a line on which the lower portion of the flat section 14C may be cut away to match the opening in the fender section 10 of the automobile as shown in FIGURE 1. In FIGURE 3, a broken line 21 indicates a line on which the lower portion of the flat section 15C may be cut away to match the opening in the fender section 11 of the automobile shown in FIGURE 1. It will be obvious to those skilled in the art that the lines 20 and 21 are illustrative only and that the flat sections 14C and 15C may be cut to match any shape of fender opening.

Figure 4:
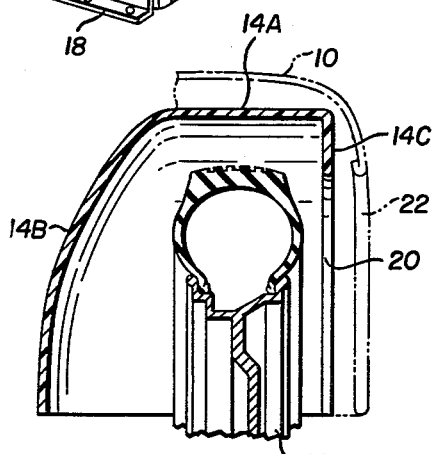
FIGURE 4 is an enlarged vertical section on line 4—4 of FIGURE 1.

In FIGURE 4 of the drawings, a view on an enlarged scale taken on line 4—4 of FIGURE 1 may be seen and the relative position of the fender boot may be seen with respect to the wheel 16, the fender section 10 and the conformation of the cut away part of portion 14C with the opening in the fender section 10 which is indicated in FIGURE 4 by the numeral 22.

Figure 5:
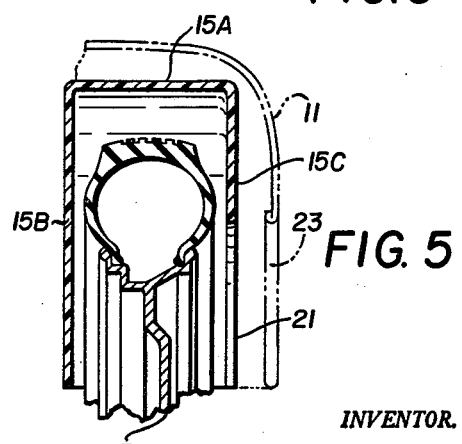
FIGURE 5 is an enlarged vertical section on line 5—5 of FIGURE 1.

In FIGURE 5 of the drawings, a similar view illustrates the relative positioning of the rear wheel 17 and the rear fender section 11. The cut away line 21 in the section 15C will be seen to conform with the opening 23 in the rear fender section 11.

It will thus be seen that the fender boots disclosed herein meets the several objects of the invention and having thus described my invention, what I claim is:

1. Fender boots for an automobile having wheel housings each of said boots comprising a secondary unitary housing formed of waterproof plastic material, said secondary housing being open at its bottom end, fasteners on said secondary housing securing said secondary housing in a wheel housing of said automobile in spaced relation to said wheel housing thereof, said fender boots having at least one wall portion adapted to be cut away to match an exterior opening in said wheel housing in which said secondary housing is installed.

2. Fender boots for an automobile having wheel housings and wheels positioned therein, said fender boots each comprising a secondary integral housing of waterproof resilient plastic material, said secondary housing having a vertically positioned flat front section the upper edge of which is curved and a spaced rear section the upper edge of which is curved and an arcuate section joining the same at their curved upper edges, said secondary housing having an open bottom, fasteners on said housing acting to hold said secondary housing in spaced shape conforming relation in one of said wheel housings in said automobile and in a position partially enclosing the wheel therein and defining an open air circulating passageway between said secondary housing and said wheel housing.

3. The fender boots set forth in claim 2 and wherein the fasteners on said secondary housing comprise brackets secured to said arcuate sections.

4. The fender boots set forth in claim 2 and wherein the plastic material of said secondary housing comprises polyethylene.

5. The fender boots set forth in claim 2 and wherein the spaced rear section of said secondary housing is bowed horizontally to accommodate a front wheel in a front wheel housing of said automobile.

References Cited in the file of this patent

UNITED STATES PATENTS

| | | |
|---|---|---|
| 1,704,048 | Jordan | Mar. 5, 1929 |
| 1,827,435 | Nastri | Oct. 13, 1931 |
| 2,417,324 | Rivard et al. | Mar. 11, 1947 |
| 2,538,839 | Limberg | Jan. 23 1951 |
| 2,613,085 | Haltenberger | Oct. 7, 1952 |

FOREIGN PATENTS

| | | |
|---|---|---|
| 413,355 | Great Britain | July 16, 1934 |